COMMUNICATION SYSTEM

Filed July 14, 1945 2 SHEETS—SHEET 1

Inventors
Garold K. Jensen
Jacob Benveniste
By Ralph L. Chappell
Attorney

COMMUNICATION SYSTEM

Filed July 14, 1945 2 SHEETS—SHEET 2

Inventors
Garold K. Jensen
Jacob Benveniste

By Ralph L. Chappell
Attorney

Patented Jan. 1, 1952 2,580,431

UNITED STATES PATENT OFFICE 2,580,431

COMMUNICATION SYSTEM

Garold K. Jensen and Jacob Benveniste, United States Navy

Application July 14, 1945, Serial No. 605,168

3 Claims. (Cl. 250—6)

(Granted under the act of March 3, 1883, as amended April 30, 1928; 370 O. G. 757)

This invention relates in general to a pulse communication system and in particular to a multiplex type of pulse system.

An object of this invention is to provide a pulse communication system which permits the simultaneous transmission of several messages on a single carrier frequency.

Another object of this invention is to provide a pulse communication system which has low susceptibility to interference.

Another object of this invention is to provide a pulse receiving system which in the presence of incoming signals is held non-receptive except during the instant of arrival of such signals.

Another object of this invention is to provide a pulse receiving system of the foregoing type which in the absence of incoming pulse signals having a definite predetermined transmission characteristic is held continually in a condition of reception.

Another object of this invention is to provide a pulse communication system in which the recurrence rate of the pulse signal is frequency modulated to convey the intelligence of transmission.

Other objects and features of the present invention will become apparent upon a careful consideration of the following detailed description, taken together with the accompanying drawings.

In general a pulse communication system fashioned after the teaching of the present invention has provided at the transmitting end of the system, a means for emitting each pulse signal in the form of a pair of predeterminedly timed spaced pulses. At the receiving end each pair of such pulses is passed in parallel through two channels and then recombined in a common channel. Inserted in the first parallel channel is a means for delaying the pulse pairs output therefrom for a predetermined interval of time. The common channel, in which the pulses are recombined, is arranged so to respond only when the second pulse output from the second parallel channel occurs in time coincidence with the first pulse output from the delay channel. In this manner the receiving system is made to respond only to those pulse signals which arrive in pairs and to those only when the time spacing between such pairs is equal to the delay introduced in the delay channel.

Figure 1:
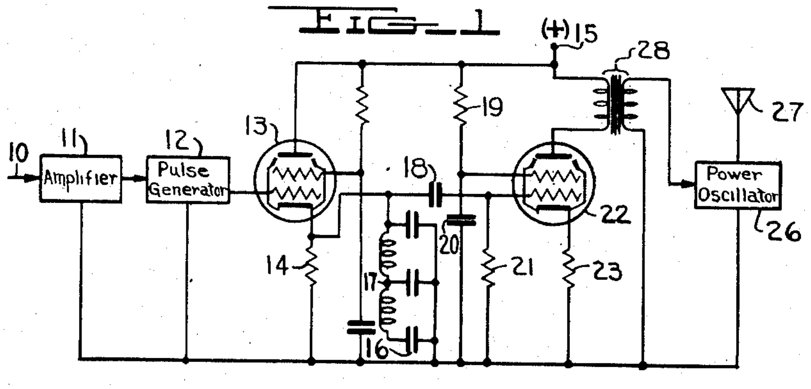
Fig. 1 is a schematic diagram, partly in block, of a transmitting system constructed according to the principles of the invention.

In the preferred case the invention is embodied in a pulse frequency modulation system, the transmitting equipment of which is shown in Fig. 1. In this figure the pulse generator 12 is of a type which is suitable to pulse frequency modulation use, such as a blocking oscillator, for example. Connected to the pulse generator 12 is an amplifier 11 which is arranged so as to alter the repetition rate of the pulse generator in response to and in accordance with an intelligence signal (speech, for example) applied to the input terminal 10. The output from the pulse generator 12 is applied to a modulator tube 22 by way of tube 13. The latter is here shown with its plate directly connected to a suitable supply source 15 and its cathode loaded by a single resistance 14. The output of this tube is taken from the cathode and is applied in parallel to the modulator 22 and to an artificial line 17. Line 17 which for purposes of illustration is shown open circuited at its output end 16 is formed by a series of lumped inductances and capacitances connected so that a finite amount of time is required for a signal to traverse its length. Thus a pulse signal applied at the input end by way of the amplifier 13 will propagate down the line to the open end where it is reflected back to the input end without a change in polarity. If the input end; that is, the end connected to tube 13, is terminated in its characteristic impedance, no reflection will occur at this point. Termination of the artificial line 17 in its characteristic impedance may be achieved by making resistance 14 equal or nearly equal thereto. Actually the termination of the line at its input end comprises resistance 14 in parallel with the series connection of capacitance 18 and resistance 21. The impedance of the latter two elements, however, is usually very large relative to resistance 14 and will therefore have no shunting effect upon the resistance 14. Therefore, since line 17 is open circuited at its output end 16 and terminated in its characteristic impedance at the input end, a pulse applied to it by way of tube 13 will later appear in the same polarity at the input end. Both the direct pulse output from the pulse generator 12 and the delayed or reflected pulse from the line 17 will then be applied to the grid of the modulator tube 22. The direct and reflected pulses are inverted by the modulator tube 22 and applied through a suitable pulse transformer 28, disposed in the plate circuit of the modulator tube, to a power oscillator 26. The latter may be of any suitable type arranged to be either grid, anode or cathode keyed in such a manner that in the absence of a pulse applied to it the oscillator is inoperative but becomes operative in response to and for the duration of an applied pulse. There will thus be emitted from antenna 27 a pair of time spaced pulses of energy for each pulse output from the pulse generator 12.

Multiplexing at the transmission system can be achieved by feeding the output of pulse geenrator 12, for example, in parallel to a number of channels similar to tube 13, each having associated delay lines such as 17 providing different time spacing between the direct and the reflected pulse. For compactness, a delay line is preferred in providing the timed spaced pulses, it being understood, however, that any other means may be used if desired.

Figure 2:
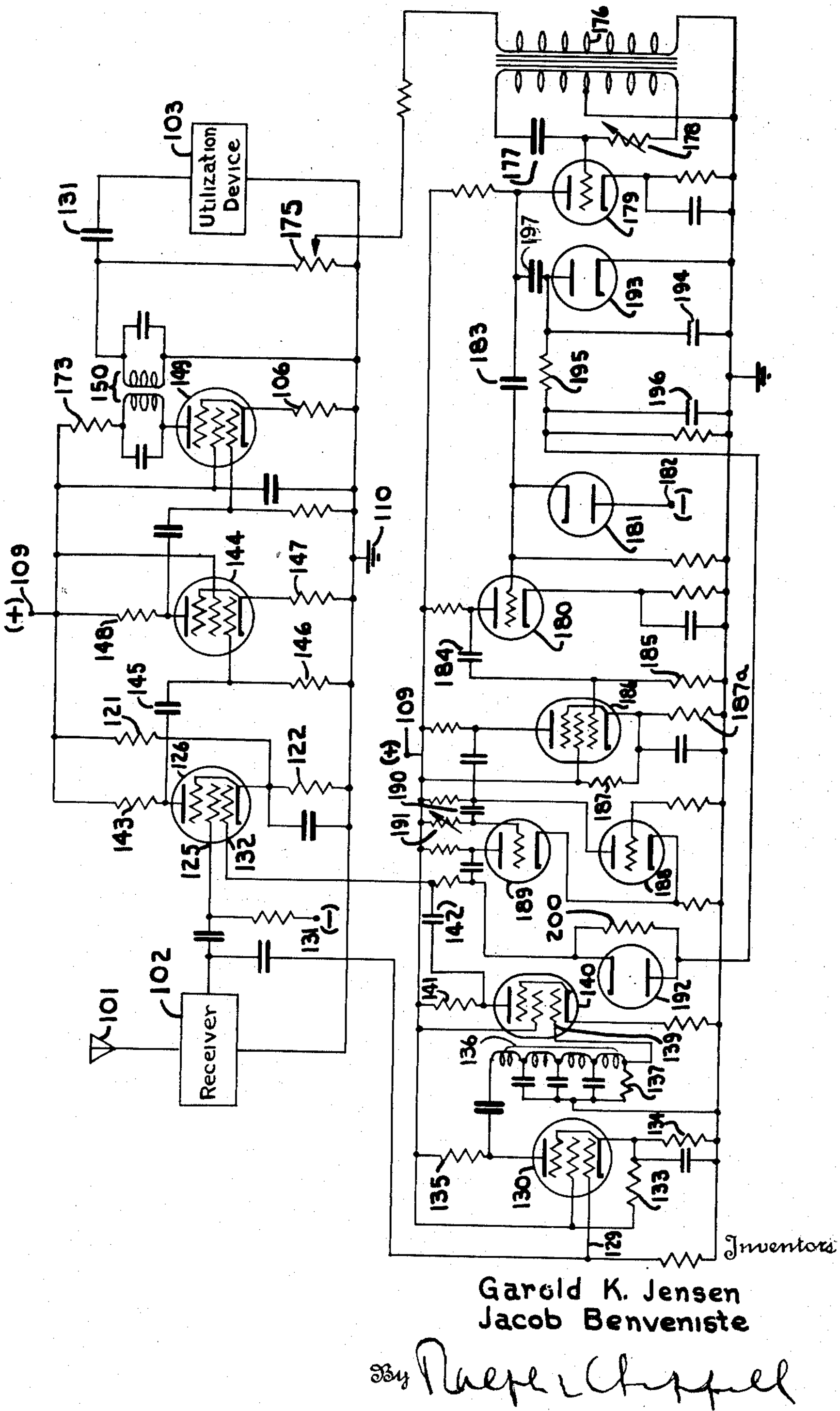
Fig. 2 is a schematic diagram, partly in block, of a receiving system constructed according to the principles of the invention.

The receiving equipment of the invention is shown in Fig. 2. Each pair of pulses emitted by the transmitter of Fig. 1 is received by the antenna 101, detected and amplified by the receiver 102 and applied in parallel to the screen grid 125, for example, of a first amplifier 126 and to the control grid 129 of a second amplifier 130. The receiver 102 may be a conventional pulse type superheterodyne receiver and may, if desired, contain a limiting stage arranged to provide a uniform amplitude pulse output therefrom, preferably in the form of positive pulses. The first amplifier 126 is normally biased beyond cut-off by means of a negative voltage 131 maintained on its screen grid 125 and also by means of its cathode connection to the juncture point of resistances 121 and 122 which are connected in series between the positive supply 109 and ground. The second amplifier 130 is normally biased near cut-off by means of its cathode connection to the juncture of resistances 133 and 134 which are connected in series between the positive supply 109 and ground. The first positive pulse of a pair of received pulses causes heavier conduction by tube 130 to thus produce a negative pulse across its plate load resistance 135. The action occurring at the first amplifier 126 at this instant is quite different since regardless of what is happening to the screen grid 125 the bias on the control grid 132 prevents tube 126 from conducting. Consequently the first pulse of a pair of received pulses is suppressed from the output of amplifier 126. The negative pulse produced at the plate of 130 is fed into a delay line indicated by lumped inductances and capacitances at 136. This delay line is terminated in a resistance 137 which, together with the input impedance of stage 140 is equivalent to the characteristic impedance of the delay line. The negative pulse output from tube 130 will thus propagate down the delay line 136 without reflection and appear at the grid 139 of tube 140 a predetermined time interval after its application to the line 136. Since no reflection occurs in this delay line the time required for a pulse to travel one way down the line should equal that required for a pulse to travel both ways through the line 17 of the transmitter. Tube 140 is normally biased conducting and is driven to cut-off by the delayed negative pulse applied to the grid 139 to thereby produce a positive pulse across its plate load resistance 141. This positive pulse is applied by means of capacitance 142 to the grid 132 of tube 126. Therefore, by adjusting the delay line 136 so that the delayed first pulse is applied to the control grid 132 at the same time the second pulse of the pair is applied to screen grid 125, with no additional bias being applied to either grid, tube 126 will conduct resulting in the production of a single negative pulse across the plate load resistance 143. The repetition rate of this negative pulse will of course vary in accordance with the variation of frequency of the pulse generator 12 in the transmitter. Actually and for the purpose of further reducing the system's susceptibility to interference a signal produced biasing voltage is applied to the grid 132 of tube 126 so that in addition to the simultaneous application of the delayed pulse to grid 132 and the direct pulse to grid 125 a "gating pulse" applied to grid 132 becomes necessary in order to provide an output from tube 126 is fully described in the following paragraphs.

The single negative pulse produced at the plate of tube 126 is applied to a shaper and inverter tube 144 by means of the coupling network comprising capacitance 145 and resistance 146. Tube 144 is normally conducting, bias for this tube being supplied solely by the unbypassed cathode resistance 147. Conduction by 144 is fully interrupted by the negative pulse from tube 126 to thus produced a uniform amplitude positive pulse across the plate load resistance 148.

The shaped positive pulses from the plate of 144 are in turn applied to a pulse to sine wave conversion stage comprising tube 149 and its associated plate connected double tuned transformer 150. This transformer is tuned to the average (without modulation) repetition frequency of the pulse generator 12 in the transmitter of Fig. 1. The transformer band width in this case is made approximately 6 kc. (kilocycles per second) permitting a variation of 3 kc. on either side of the mean frequency with little distortion. Tube 149 is normally biased by means of its unbypassed cathode resistance 106 such that the positive pulse output from tube 144 causes tube 149 to conduct surges of current. These current surges shock the tuned transformer 150 into damped oscillations. The high D.-C. current drawn by tube 149 during the application of a pulse causes damping of the tuned circuit; but oscillation is resumed at the conclusion of the pulse. Thus a single sinusoidal oscillation of transformer 150 results for each pulse in a train of input pulses with the frequency of the sinusoidal oscillations being approximately equal to the repetition frequency of the input pulses.

As the mean pulse repetition frequency varies due to modulation, the oscillatory output voltage of the transformer secondary will consist of a signal having simultaneous frequency and amplitude modulation, both types of modulation occurring at the frequency of the modulation produced in the transmitter system.

The transformer output signal is then applied, for example, to a suitable utilization network which may comprise a limiter, a discriminator, an audio amplifier and an audio reproducing device all of conventional design and connected together in the order given. As the frequency modulated pulse signal applied to the discriminator, is, in the typical case, in the range 7 to 13 k. c., it falls within the audible range. To prevent this signal from reaching the audio amplifier a low pass filter of conventional design may be interposed between the output of the discriminator and the audio amplifier.

In spite of the inherent low sensitivity of the system to interference, it has been found desirable to incorporate further noise and interference reducing features as shown at the bottom right of Fig. 2. In general the noise reducing circuit utilizes the demodulated output signal from the receiver to generate a unilateral biasing potential which is applied to the grid 132 of tube 126 to prevent operation of tube 126 except during the application of a "gating pulse" also produced by the circuit at the bottom right of the drawing. In generating the "gating pulse" the circuit receives the same demodulated output from the receiver, shapes it into a rectangular wave which in turn is used as a keying signal for triggering a pulse generating circuit. The output from the latter is in turn applied to the grid 132 of tube 126 whereby the effects of the signal produced biasing voltage are overcome and tube 126 is left free to produce an output pulse in response to the simultaneous application of pulse signals to its grids 125 and 132.

In particular the demodulated signal used in operating the interference reducing circuit is obtained from across the secondary of transformer 150 by the movable tap on the potential divider 175 and applied to the primary of a second transformer 176. The latter transformer contains a secondary winding, the center tap of which is grounded, which is loaded by the series connected capacitance 177 and variable resistance 178 which forms a phase shift network. The phase shifted output from the transformer 176 is amplified by tube 179 and applied through capacitance 183 to the grid of a clipper-amplifier tube 180. Connected in shunt with the grid of tube 180 is a diode 181 the plate of which is connected to a negative potential 182. The purpose of diode 181 is to prevent the grid of tube 180 from being driven negative beyond the potential 182 during any part of the applied signal from tube 179 which thus acts to clip or square up the negative grid swings. In a similar manner the grid and cathode of tube 180 act as a diode; that is as the grid is driven slightly above the cathode potential by the applied signal from tube 179, grid current starts to flow which causes a negative charge to accumulate on condenser 183 and a consequent limiting of the maximum positive grid swing. In other words the actual grid signal applied to tube 180, drives the grid between the cathode potential and that of the negative supply 182.

The resulting voltage variation present at the plate of tube 180 is rectangular in shape and is applied through a differentiator circuit comprising capacitance 184 and resistance 185 to the grid of a second clipper amplifier 186. The differentiator circuit functions to produce alternate time spaced positive and negative voltage pulses at the grid of tube 186 and corresponding respectively to the positive and negative going edges of the rectangular wave output from tube 180.

Tube 186 is biased to cut off by the voltage divider action of resistances 187, 187-*a* which are connected in series between the positive supply 109 and ground. Tube 186, however, is brought to conduction to thereby produce a negative pulse output during the positive peaks of the applied differentiated rectangular wave.

Connected to tube 186 is a one-shot cathode-coupled multivibrator comprising tubes 188 and 189 with the grid of tube 189 returned to B+ so that tube is held normally conducting. The negature pulse produced at the plate of 186 when that tube becomes conducting is applied to the grid of 189 cutting the latter tube off and producing a positive pulse at its plate. This pulse which is terminated when the capacitance 190 discharges through resistance 191 sufficiently to permit tube 189 to resume conduction, is applied to the grid 132 of tube 126 as the aforementioned "gating pulse."

The signal produced biasing voltage which the abovementioned "gating pulse" is to overcome and which is maintained on grid 132 of tube 126 is developed by the action of the bias clamping diodes 192—193. Rectification by diode 193 on the positive crests of the sine wave voltage obtained from the plate of tube 179 develops a charge on capacitance 197 producing a sinusoidal voltage having a D.-C. component at the plate of tube 193. This voltage is filtered by the low-pass filter 194, 195, 196 and is applied as a negative D.-C. voltage to the plate of 192 and through resistance 200 to the grid 132 of tube 126. The cathode of 192 and grid 132 of tube 126 are thereby maintained at a negative voltage, which, between the pulse signals, cannot fall far below the voltage established by tube 193. The bias on both grids 125 and 132 of tube 126 is therefore maintained such that this tube can be brought to conduction only when three signals, the delayed first pulse (from 140), the second pulse (of the received pair) and the "gating pulse" produced by the multivibrator 188 and 189 are applied simultaneously. In practice the relative time occurrence of the "gating pulse" is adjusted by means of the variable resistance 178 in the phase shifting network so that it occurs at the time the delayed first pulse is applied to 132. The width of the "gating pulse" is made somewhat greater than the width of the input pulses, by adjustment of resistance 191, to thus compensate for variations in time occurrence of said input pulses which may exist due to modulation.

The biasing diode 193 provides bias for the grid 132 of tube 126 only when a signal is being applied to tube 179. In absence of a signal input to tube 179, the negative voltage is not present at the plate of diode 193 since rectification by that tube cannot take place. Therefore it is possible initially for the delayed pulse from 140 alone to raise the grid 132 of tube 126 above cut-off, to permit conduction by that tube upon simultaneous application of a similar positive pulse to grid 125.

Figure 3:
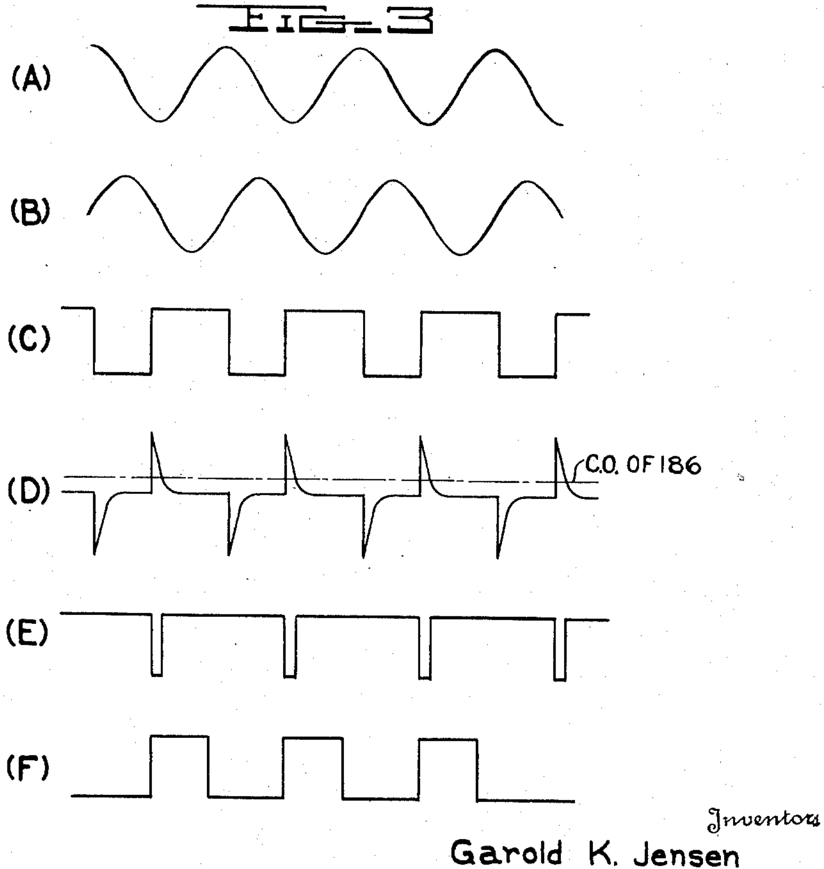
Fig. 3 shows a series of waveforms which are useful in explaining, in part, the operation of the circuit shown in Fig. 2.

To illustrate more precisely the action of the noise gating circuit of Fig. 2 reference is had in particular to the waveforms of Fig. 3. Waveform A is representative of the sine wave input to the transformer 176 while waveform B is representative of the phase shifted output from the transformer which has by adjustment of resistance 178, been shifted 90° from waveform A. Waveform C is representative of the rectangular wave output from tube 180 and waveform D shows the results of differentiating this signal. Finally waveforms E and F are representative respectively of the input keying signal to tube 189 of the multivibrator and the output "gating pulse" of this tube. Since the received pulse signals are frequency modulated in character, the time sequence of the received pulse signals will vary according to the modulation. The phase shifter, however, being of the resistance capacitance variety driven from the frequency modulated signal will produce to a certain extent automatic phase shifting of the sine wave signal input to the amplifier tube 179. This automatic phase shifting will cause the gating signal shown at waveform F to follow the time sequence changes in the received pulse signal.

By means of the invention several different messages may be conveyed simultaneously over the same transmitter and receiver and routed to any of several specific utilization devices by employing a number of different spacings of the pulses in each pair of pulses. This can be accomplished by employing several demodulator units connected in parallel to the receiver output and making appropriate changes of a similar nature in the transmitter modulation system.

Although we have shown the present system as applied to transmission systems using radio frequency "carrier" means with transmission and reception without wired connections, it is apparent that such a system could be applied to wired or other types of transmission, therefore this invention is not to be limited except by the spirit of the prior art or the scope of the appended claims.

The invention described herein may be manufactured and used by or for the Government of the United States of America for government purposes without the payment of any royalties thereon or therefor.

What is claimed is:

1. A pulse communication system comprising, a means for generating a series of pulse signals, means for frequency modulating said pulse signals in accordance with the intelligence it is desired to transmit, means for transforming each pulse signal in said series into a pair of predeterminedly time spaced pulse signals, means transmitting said pairs of pulse sginals, means receiving said pairs of signals at a remote point, a pair of amplification channels, means feeding said pairs of received signals in parallel to said channels, a delay means inserted in one of said channels and acting to delay the output therefrom by an interval of time equal to the spacing between the pulses comprising each of said pairs, means adapted to receive the output from each of said channels, said last named means operating to produce a single pulse output in response to coincidental signals from said channels, means for transforming the pulse output from said last named means into a frequency modulated sine wave and a gating means for further operating said last named means, said gating means comprising a phase shifting device adapted to receive the frequency modulated sine wave output, means for squaring up said phase shifted output, and a pulse generator operating in response to the output of said squaring means and applying a pulse gate to said last named means.

2. In a pulse communication system in which the received pulse signals are transformed into sinusoidal oscillations to convey the intelligence of the received signals, the combination of, a gated amplifier circuit, multiple biasing means holding said gated amplifier circuit to one conductive condition, a plurality of signal input circuits to the gated amplifier circuit operative to change conductivity of the gated amplifier circuit to a selected level upon simultaneous occurrence of three selected input signal conditions, a first signal path applying received signals to one signal input circuit, a second signal path applying received signals to a second signal input circuit after selected delay, and a third signal path receiving transformed sinusoidal oscillations periodically applying short duration signals to one of the signal input circuits in synchronism with received signals recurring at a selected rate.

3. In a pulse communication system wherein signal intelligence is transmitted as recurrent pairs of predetermined time spaced pulses, a receiver including a gated amplifier circuit, biasing means holding said gated amplifier circuit to one conductive condition, a plurality of signal input circuits to the gated amplifier circuit operative to change conductivity of the gated amplifier circuit to a selected level upon simultaneous occurrence of three selected input signal conditions, a first signal path applying the received signals to one signal input circuit, a second signal path applying the received signals to a second signal input circuit after selected delay, and a gating signal source periodically applying short duration signals to one of the signal input circuits in synchronism with the received signals.

GAROLD K. JENSEN.
JACOB BENVENISTE.

REFERENCES CITED

The following references are of record in the file of this patent:

UNITED STATES PATENTS

| Number | Name | Date |
|---|---|---|
| 2,266,401 | Reeves | Dec. 16, 1941 |
| 2,361,437 | Trevor | Oct. 31, 1944 |
| 2,406,019 | Labin | Aug. 20, 1946 |
| 2,406,165 | Schroeder | Aug. 20, 1946 |
| 2,412,974 | Deloraine | Dec. 24, 1946 |
| 2,458,633 | Peterson | Jan. 11, 1949 |